US005473364A

United States Patent [19]
Burt

[11] Patent Number: 5,473,364
[45] Date of Patent: Dec. 5, 1995

[54] VIDEO TECHNIQUE FOR INDICATING MOVING OBJECTS FROM A MOVABLE PLATFORM

[75] Inventor: Peter J. Burt, Princeton, N.J.

[73] Assignee: David Sarnoff Research Center, Inc., Princeton, N.J.

[21] Appl. No.: 253,512

[22] Filed: Jun. 3, 1994

[51] Int. Cl.⁶ ...................................................... H04N 7/18
[52] U.S. Cl. .......................... 348/47; 348/144; 348/154; 348/155; 348/169
[58] Field of Search .................................... 348/144, 154, 348/155, 47, 169; H04N 7/18

[56] References Cited

U.S. PATENT DOCUMENTS

| | | | |
|---|---|---|---|
| 4,692,806 | 9/1987 | Anderson et al. | 348/399 |
| 5,134,473 | 7/1992 | Nagura | 348/144 |
| 5,270,756 | 12/1993 | Busenberg | 348/144 |
| 5,296,926 | 3/1994 | Nagura | 348/144 |

OTHER PUBLICATIONS

Anderson, et al "Change Detection & Tracking Using Pyramid Transform Techniques" SPIE Conference on Intelligent Robotics & Computer VisionBoston Mass., Sep. 1985 SPIE vol. 579.
P. J. Burt, et al "Object Tracking With A Moving Camera An Application Of Dynamic Motion Analysis" Proceedings of the Workshop on Visual Motion, Irvine Calif., Mar. 20–22, 1989 pp. 1–12.
K. J. Hanna, "Direct Multi–Resolution Estimation Of Ego–Motion & Structure From Motion IEEE Workshop on Visual Motion", Princeton N.J. Sep. 1991.

*Primary Examiner*—Howard W. Britton
*Attorney, Agent, or Firm*—William J. Burke

[57] ABSTRACT

An imaging technique, suitable for surveillance use by a moving robotic vehicle carrying two spatially displaced fixed cameras aligned with the direction of travel or, alternatively, a single camera movable to either of two positions on the vehicle corresponding to the positions occupied by the fixed cameras, is capable in a moving object indicator mode of deriving first image data of a viewed scene at a first time from a first position with respect to the vehicle and of deriving second image data of the viewed scene at a second time from a second position with respect to the vehicle that is spatially displaced a given distance from the first position such that the spatial position with respect to the viewed scene depicted by the second image data at least approximates the spatial position with respect to the viewed scene depicted by the first image data. As an aid to detecting driving hazards encountered by the moving vehicle, the imaging technique may also be operated in a stereo-vision mode, in which the first and second image data is derived at the same time from the same angle of gaze of the viewed scene.

12 Claims, 4 Drawing Sheets

VIDEO TECHNIQUE FOR INDICATING MOVING OBJECTS FROM A MOVABLE PLATFORM

BACKGROUND OF THE INVENTION

As is well known, there are video techniques for indicating moving objects from a stationary platform that operate by simply subtracting from the amplitude of each pixel of a current video image frame, the amplitude of that pixel of a stored preceding video image frame that corresponds thereto. This results in the substantial removal of those pixels of the video image pixels that define stationary objects. Digital image processing techniques which may be employed in this frame difference approach are disclosed in U.S. Pat. No. 4,692,806, which issued on Sep. 8, 1987, and in the Anderson et al. article "Change Detection and Tracking Using Pyramid Transform Techniques", SPIE Conference on Intelligent Robotics and Computer Vision, Boston Mass., 1985, SPIE Vol. 579, both of which are incorporated herein by reference.

Also incorporated herein by reference is the disclosure of the Burt et al. article "Object tracking with a moving camera, an application of dynamic motion analysis", IEEE Workshop on Visual Motion, Irvine Calif., March 1989, if the camera is moving, which teaches that it is often possible to compensate for the resulting image motion by electronically shifting and rotating successive image flames to achieve alignment prior to computing a frame difference. Such electronic alignment is based on a simple image warp (e.g., based on an affine transform) that is effective when scene motion contains relatively little parallax, such as when the camera is rotating, but not translating, or when objects within the region of the camera's field of view for which alignment is performed occur in a relatively narrow range of depths.

Further incorporated herein by reference is the disclosure of the Hanna article "Direct multi-resolution estimation of ego-motion and structure from motion", IEEE Workshop on Visual Motion, Princeton N.J., October 1991, which teaches that electronic alignment can be generalized to compensate for parallax motion by including an image processing step that recovers an estimate of the distance to objects in a scene based on the observed motion. The estimated distance along with estimates of the camera's own motion are then used to predict and compensate for parallax motion.

The existing image processing techniques for depth recovery and parallax compensation have possible practical limitations. These image processing techniques are costly to compute. In addition, they can make significant errors in depth estimates along the boundaries between nearby and more distance objects in the image.

The video technique of the present invention is directed to overcoming such problems.

SUMMARY OF THE INVENTION

The invention is directed to apparatus for viewing a scene from a moving platform, in which the apparatus comprises (1) means including camera means situated on the moving platform for deriving first image data of the scene at a first time from a first position with respect to the moving platform and for deriving second image data of the scene at a second time from a second position with respect to the moving platform that is spatially displaced a given distance from the first position such that the spatial position with respect to the viewed scene depicted by the second image data at least approximates the spatial position with respect to the viewed scene depicted by the first image data, and (2) image processing means responsive to the first and second image data for deriving particular information therefrom. The apparatus is capable of being operated either in a moving object indicating mode or in a stereo-vision mode.

The invention is also directed to an imaging method for distinguishing moving objects from stationary objects in a scene that is viewed from a moving platform, in which the method comprises the step of deriving first image data of the scene at a first time from a first position with respect to the moving platform and for deriving second image data of the scene at a second time from a second position with respect to the moving platform that is spatially displaced a given distance from the first position such that the spatial position with respect to the viewed scene depicted by the second image data at least approximates the spatial position with respect to the viewed scene depicted by the first image data.

DETAILED DESCRIPTION

Figure 1:
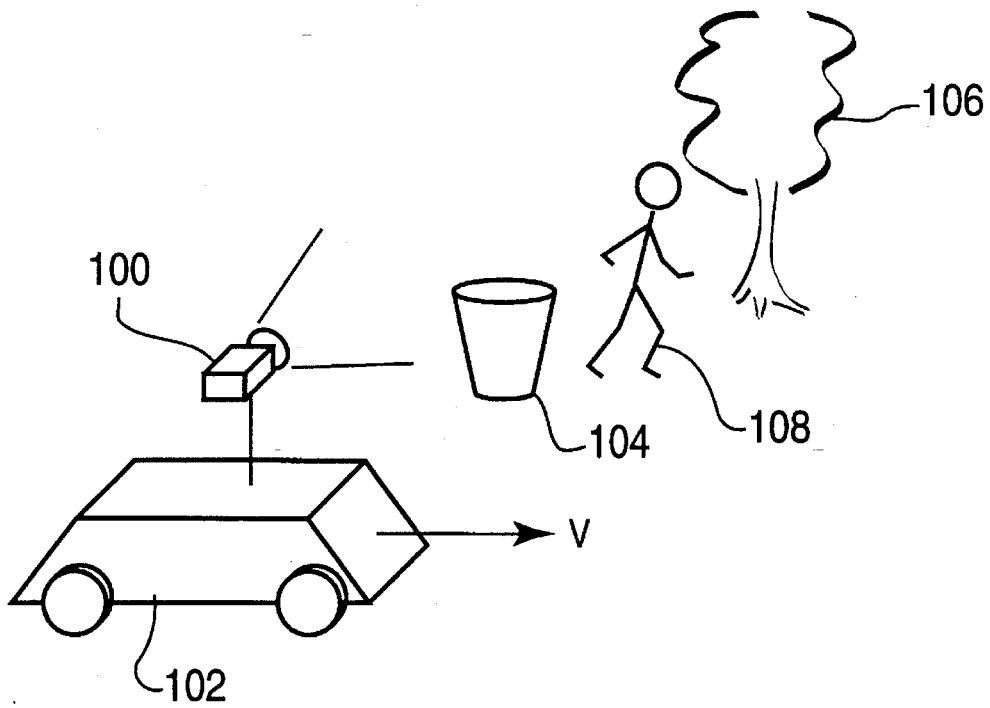
FIGS. 1 and 1a diagrammatically illustrate a moving-object indicator problem that occurs due to parallax when a scene comprising both stationary and moving objects at different depths are viewed by a single video camera that is fixed in position on a moving vehicle.
Figure 1A:
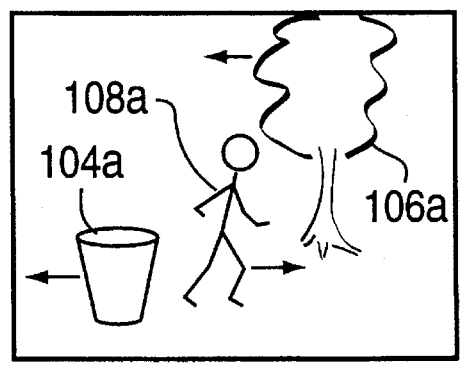

Any movement detected in the images of a scene viewed by a stationary video camera, such as the video camera employed in the surveillance apparatus disclosed in the aforesaid U.S. Pat. No. 4,692,806, must be solely due to one or more moving objects in the scene. However, as shown in FIG. 1, when the video camera 100 viewing a scene is situated on a movable platform, such as vehicle 102 moving from left to right at a forward velocity V, this is no longer true. More particularly, video camera 100, which itself is moving at velocity V, is viewing a scene comprising stationary trash can 104 situated relatively close to video camera 100, stationary tree 106 situated relatively far from video camera 100, and moving person 108 situated between trash can 104 and tree 106 who is walking in about the same direction as vehicle 102 is moving. FIG. 1a diagrammatically shows the images of the scene viewed by video camera 100. As indicated by the relative length and direction of the arrows of the ongoing images shown in FIG. 1a, due to parallax, closer stationary trash can 104a moves in the image from right-to-left at a faster rate than does more distant tree 106a, while moving person 108a moves in the image from left-to-right at a relatively slow rate.

There is a need for an image processing technique for detecting moving objects in an environment using cameras mounted on a platform that is also moving through that environment. Practical applications for such a capability include such examples as (1) a robotic vehicle performing duties of a security guard patrolling a warehouse, or other secure area, for detecting intruders based on their motion; (2) an autonomous vision system on a car or truck for discriminating between moving and stationary objects in the road, as an aid to detecting hazards to driving and (3) a target detection system on a moving surveillance platform for detecting moving objects in the battlefield. However, a surveillance apparatus of the type disclosed in the aforesaid U.S. Pat. No. 4,692,806 that employs single moving video camera 100 of FIG. 1 cannot discriminate between moving objects in the video image from single moving video camera 100 due to actual moving objects in the scene and stationary objects in the scene that apparently move in the video image due to camera motion. The present invention provides a technique capable of removing the stationary objects in the viewed scene, such as stationary trash can 104 and tree 106 of FIG. 1, regardless of their apparent motion in the image, and detecting all moving objects, such as moving person 108, in this viewed scene.

Figure 2:
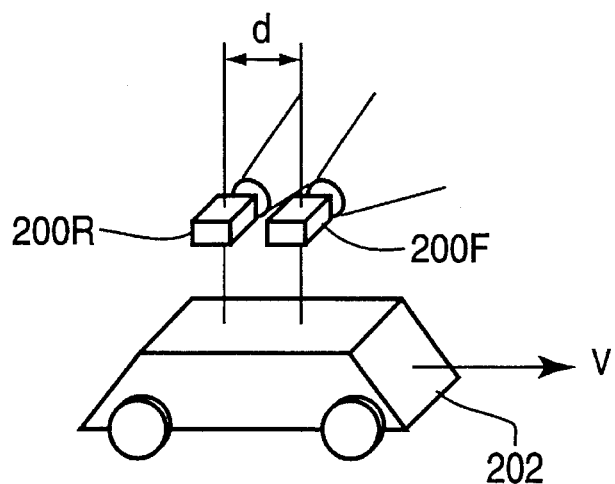
FIG. 2 diagrammatically illustrates a first embodiment of the present invention employing two spatially displaced video cameras that are both fixed in position on a moving vehicle.
Figure 2A:
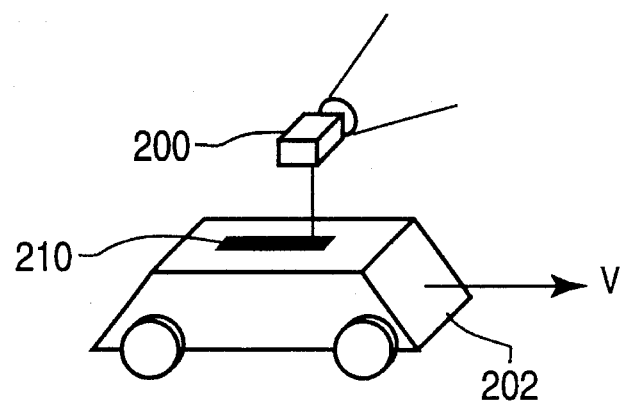
FIGS. 2a and 2b diagrammatically illustrate a second alternative embodiment of the present invention employing a single video camera that is movable in position on a moving vehicle.
Figure 2B:
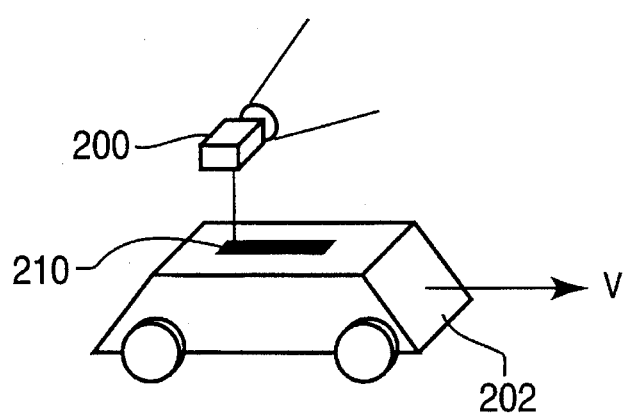

More particularly, FIG. 2 shows a first structural embodiment of surveillance apparatus comprising two video cameras 200F and 200R situated on a movable platform, such as an automatically-controlled (no driver) vehicle 202 moving from left to right at a forward velocity V. As indicated, video cameras 200F and 200R, both pointing in substantially the same direction to view a scene (such as that shown in FIG. 1), are displaced from one another by a fixed distance d that is substantially aligned with the direction of forward velocity V. FIGS. 2a and 2b show a second alternative structural embodiment of surveillance apparatus in which a single video camera 200 riding on rail 210 attached to the roof of vehicle 202 may be moved back and forth in its position from the front of rail 210, as indicated in FIG. 2a, to the rear of rail 210, as indicated in FIG. 2b. Thus, in this alternative structural embodiment, video camera 200 in its FIG. 2a position corresponds to video camera 200F of FIG. 2, while video camera 200 in its FIG. 2b position corresponds to video camera 200R of FIG. 2.

It is apparent that at the same instant in time video cameras 200R and 200F will occupy different spatial positions, but that after a given time interval, that depends on the value of forward velocity V of vehicle 202, video camera 200R will occupy substantially the same spatial position formerly occupied by video camera 200F. Similarly, after such a given time interval, video camera 200 in its FIG. 2b position will occupy substantially the same spatial position formerly occupied by video camera 200 in its FIG. 2a position.

Figure 3:
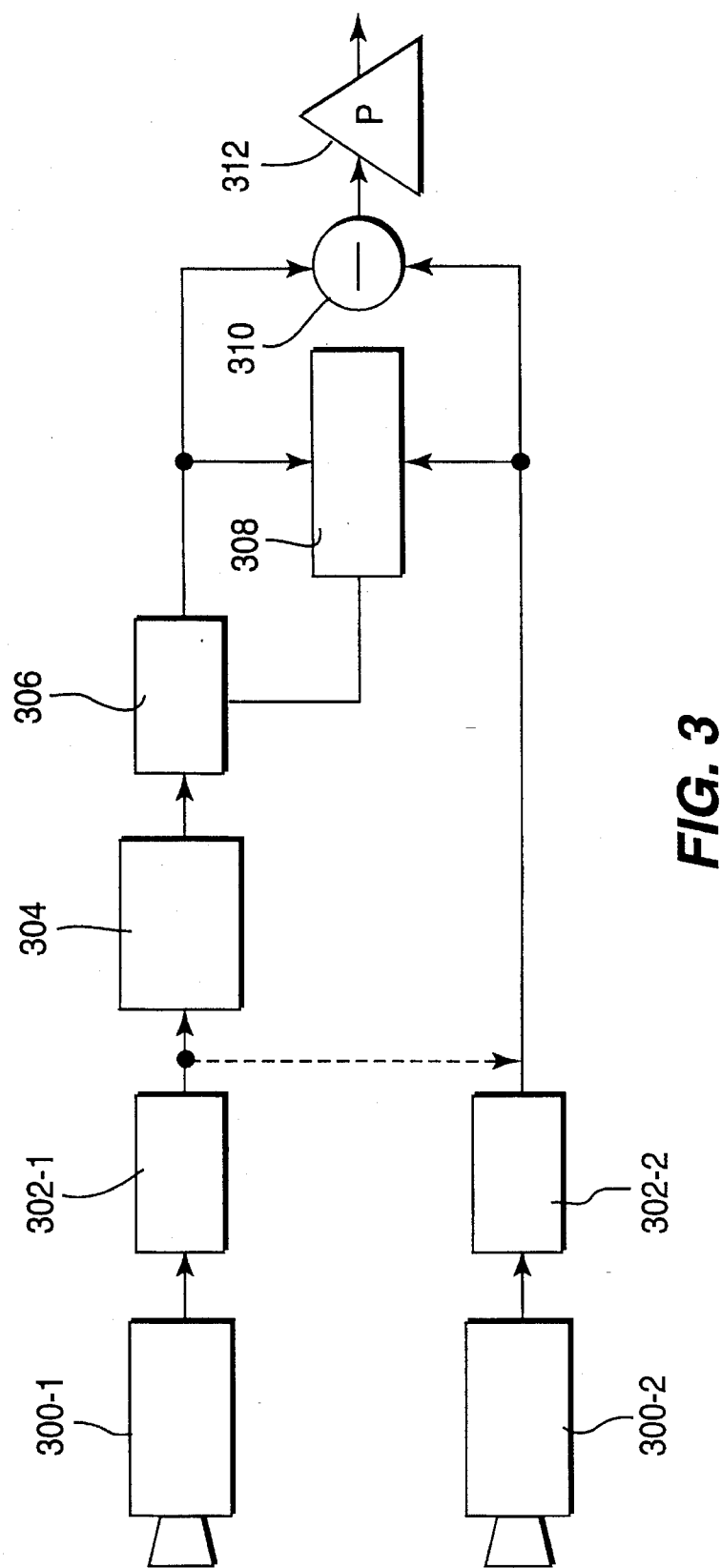
FIG. 3 is a block diagram of a moving-object image processor capable of processing video signals derived from either the first embodiment of FIG. 2 or the second embodiment of FIGS. 2a and 2b.

FIG. 3 is a block diagram of digital image processing means for detecting only objects that are actually moving in a scene being viewed by moving video cameras. More particularly, in a first case, FIG. 3 comprises two video cameras 300-1 and 300-2, which correspond, respectively, to video cameras 200R and 200F of FIG. 2 that are moving forward along with vehicle 202 on which they are situated at a velocity V, for deriving video signals, analog or digital as the case may be, defining image frames. Alternatively, in a second case, the video signals may be derived from only single video camera 300-1 which corresponds to video camera 200 in each of its respective positions of FIGS. 2a and 2b.

In both the first and second cases, the analog video signals from video camera 300-1 are converted to digital video signals by analog-to-digital (A/D) converter 302-1. At regular time intervals, an image frame of digital video signals from A/D 302-1 is stored in frame store memory 304 to provide a given time delay for that image frame. At the end of this given time delay, the image defined by that stored image frame is read out of memory 304 and warped by warp means 306 by an amount controlled by the output of estimate residual means 308 (such warp means and estimate residual means being disclosed in the aforesaid Burt et al. article). The warped image output from warp means 306 is applied as a first input to estimate residual means 308 and as a minuend input to subtraction means 310.

In the first case, the analog video signals from video camera 300-2 are converted to digital video signals by A/D converter 302-2, and the digital output from A/D converter 302-2 is applied directly as a second input to estimate residual means 308 and as a subtrahend input to subtraction means 310 in time coincidence with the application of the first input to estimate residual means 308 and the application of the minuend input to subtraction means 310. In one embodiment, the pixel by pixel digital difference output from subtraction means 310 is applied as an input to Gaussian pyramid means 312 for estimating local change in energy (such Gaussian pyramid means for estimating local change in energy being disclosed in U.S. Pat. No. 4,692,806 and in the Anderson et al. article ). The difference values must be rectified (either square or absolute value) before Gaussian pyramid construction. The output from Gaussian pyramid means 312 may be used to implement the foveation techniques employed by the surveillance apparatus disclosed in U.S. Pat. No. 4,692,806.

In the second case, an image frame of digital video signals from A/D 302-1 is stored in frame store memory 304 only when video camera 300-1 assumes a relatively front position corresponding to that of video camera 200 in FIG. 2a. An image frame of digital video signals from A/D 302-1 is applied directly as a second input to estimate residual means 308 and as a subtrahend input to subtraction means 310 in time coincidence with the application of the first input to estimate residual means 308 and the application of the minuend input to subtraction means 310 when video camera 300-1 assumes a relatively rear position corresponding to that of video camera 200 in FIG. 2b, as indicated by the dashed line in FIG. 3. In all other respects, the digital image processing means for the second case is identical to that described above for the first case.

The digital image processing means of FIG. 3 operates by comparing each image taken with the effectively rear moving video camera with a corresponding image taken at a prior moment in time with the effectively front moving video camera. Corresponding images are those which, although taken at different times, are taken from roughly the same position in space, as the rear moving video camera follows the front moving video camera. A pair of time-displaced images obtained from a given spatial location using two moving cameras pointing in the same direction is nearly identical to a pair obtained from that location using a single, stationary, camera.

If the distance between the effectively rear moving video camera and the effectively front moving video camera corresponding both to the FIG. 2 arrangement and the FIGS. 2a and 2b arrangements is d, and the velocity of moving platform, such as vehicle 202, is v, then the time delay t provided by frame store memory 304 should be t=d/v. Since image frames are obtained at regular intervals D, then the $n^{th}$ frame from the front camera, obtained at time $t_F(n)=t_o+nD$, is compared with the nth frame from the rear camera, obtained at time $t_R(n)=t_o+nD+t$. Further, if the cameras are rotating relative to the direction of travel as the vehicle moves in order to scan the scene, then the orientation of the rear camera $\Theta_R$ should follow that of the front camera $\Theta_F$ by the same time delay, that is $\Theta_R(t)=\Theta_F(t)$.

In practice, it is not possible to ensure that the pairs of front and rear images will be obtained from exactly the same spatial position. For this reason, the digital image processing means of FIG. 3 includes warp means and estimate residual means to provide electronic image alignment prior to image difference and change detection. Still the use of effectively front and rear moving video cameras ensures that the effective displacement between images due to vehicle motion is much smaller than if only one camera were used, and that any relative displacement due to parallax motion is correspondingly reduced. In addition, simple (e.g., affine) image alignment normally suffices when the effective two camera approach is used while more complex electronic alignment with depth recovery would be required with a single camera approach, such as employed in FIG. 1.

Figure 4A:
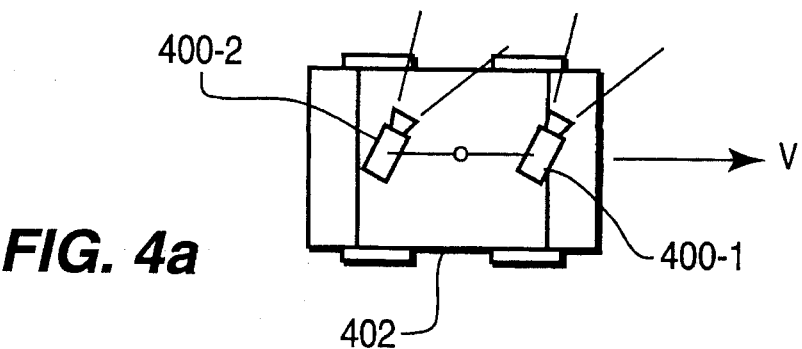
FIGS. 4a and 4b diagrammatically illustrate a third embodiment of the present invention employing two video cameras that are movable in position on a moving vehicle for selective operation in either a moving-object indicating mode when in the position shown in FIG. 4a or a stereo-vision mode when in the position shown in FIG. 4b.
Figure 4B:
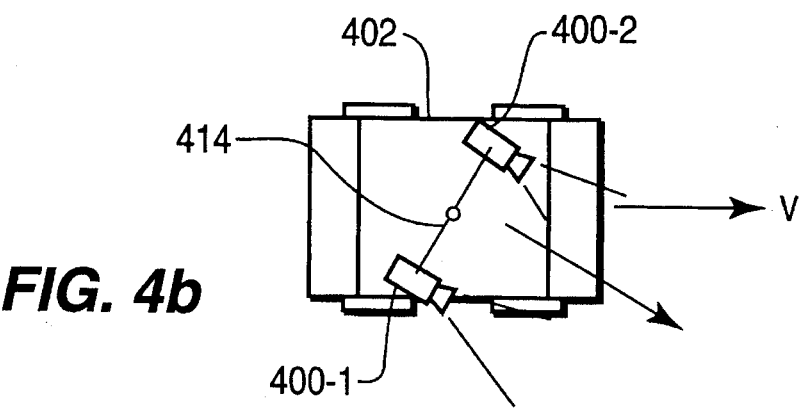

As discussed above, the surveillance apparatus of the present invention may take the form of a robotic vehicle performing duties of a security guard patrolling a warehouse, or other secure area, for detecting intruders based on their motion. For this application, as well as others, it would be desirable to provide the vehicle with a stereo vision capability as an aid to obstacle avoidance during driving, in addition to its above-discussed motion detection capability as an aid to intruder detection during surveillance. FIGS. 4a and 4b show how the same two video cameras may be used to provide both of these capabilities.

As indicated in FIGS. 4a and 4b, video cameras 400-1 and 400-2 are mounted on opposite ends of bar 414, with the middle of bar 414 being rotatably mounted on the roof of vehicle 402 for rotation about a vertical axis. Further, the pointing angle of the two video cameras 400-1 and 400-2 with respect to the length of bar 414 is adjustable. Vehicle 402 is traveling forward with a velocity v. When operating in a motion-detection mode, shown in FIG. 4a, the length of bar 414 is aligned with the forward direction of travel of the moving vehicle 402, and when operating in a stereo-vision mode, shown in FIG. 4b, the length of bar 414 is aligned roughly perpendicular to the direction of gaze of the two video cameras 400-1 and 400-2.

Figure 5:
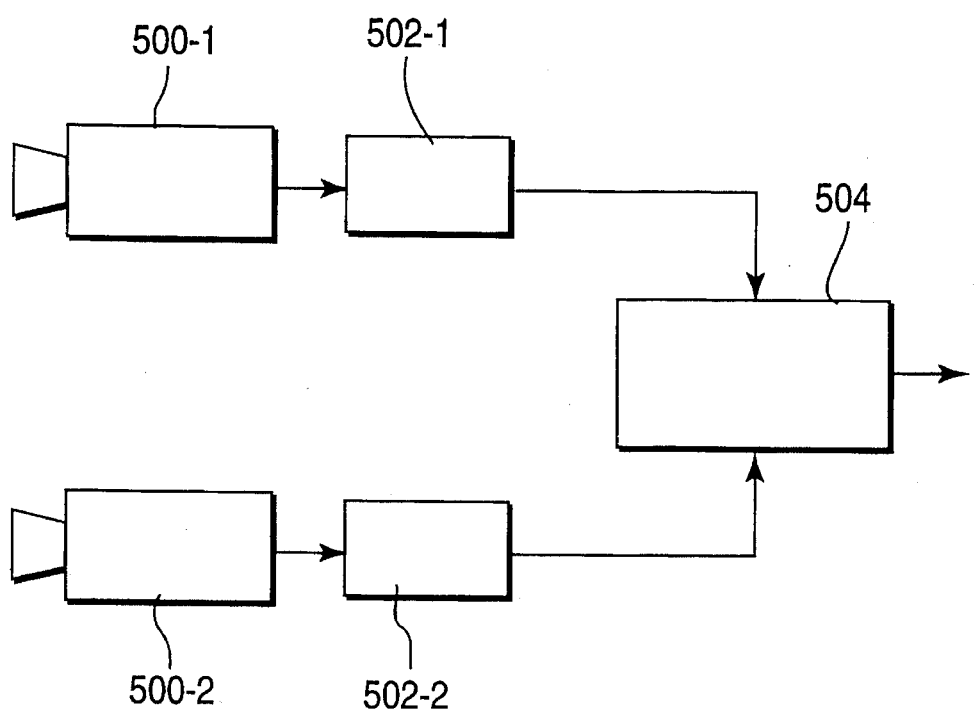
FIG. 5 is a block diagram of a stereo-image processor capable of processing video signals derived from the third embodiment when in the stereo-vision mode shown in FIG. 4b.

In FIG. 5, video cameras 500-1 and 500-2 correspond, respectively, to video cameras 400-1 and 400-2 when operated in their stereo-vision mode shown in FIG. 4b. As indicated in FIG. 5, the analog video signals forming the output from video camera 500-1 are converted to digital video signals by A/D 502-1 and then applied as a first input to stereo image processor 504, while the analog video signals forming the output from video camera 500-2 are converted to digital video signals by A/D 502-2 and then applied as a second input to stereo image processor 504. Since there is no time delay inserted in the output of either video camera 500-1 or video camera 500-2, the respective video signals applied as first and second inputs to stereo image processor 504 are applied in time coincidence with one another. The teachings of the aforesaid Hanna article may be employed in the implementation of stereo image processor 504. The output from stereo image processor 504 can then be used for controlling the steering of vehicle 402 to avoid obstacles in the path of vehicle 402.

Thus, an important advantage of the present invention is that a single image capture device can be used both for stereo and for motion detection. Further, the motion-detection image processor, shown in FIG. 3, and stereo image processor 504 can share computing modules as well.

While only two video camera are employed in the above-described preferred embodiments of the present invention, it should be understood that also contemplated is an embodiment of the invention in which more than two cameras may be arranged so that some follow others. Further, image processing may take place either on the movable platform itself or, alternatively, the input data required for image processing may be transmitted from the movable platform to a remote location so that the image processing may take place at this remote location.

I claim:

1. In apparatus for viewing a 3-dimensional scene from a moving platform, wherein said 3-dimensional scene may include objects at different distances from said moving platform; said apparatus comprising:

means including camera means situated on said moving platform that points said camera means in a predetermined direction toward said scene for deriving first image data of said scene at a first earlier time from a first position with respect to said moving platform and that points said camera means in substantially the same predetermined direction toward said scene for deriving second image data of said scene at a second later time from a second position with respect to said moving platform that is spatially displaced a given distance from said first position such that the spatial position with respect to said viewed scene depicted by said second image data at least approximates the spatial position with respect to said viewed scene depicted by said first image data, whereby said first and second image data results in minimizing the depiction of parallax between relatively near and far objects in said 3-dimensional scene caused by movement of said moving platform; and image processing means responsive to said first and second image data for deriving information therefrom that indicates those objects in said viewed scene that are moving with respect to stationary objects in said viewed scene and substantially removes any indication of said stationary objects in said viewed scene.

2. The apparatus defined in claim 1, wherein:

said moving platform is moving in a given direction of travel with a given velocity;

said means including camera means includes a camera situated at said first position at said earlier first time and a camera situated at said second position at said later first time, said second position being spatially displaced from said first position by a given distance that is substantially aligned with said given direction of travel; and the time difference between said later second time and said earlier first time is substantially equal to the quotient of said given velocity divided by said given distance.

3. The apparatus defined in claim 2, wherein:

said means including camera means includes first and second separate cameras, said first camera being fixed to said moving platform at said first position and said second camera being fixed to said moving platform at said second position.

4. The apparatus defined in claim 2, wherein:

said means including camera means includes a single camera that is movable with respect to said movable platform between said first position and second positions, said single camera occupying said first position at said earlier time and occupying said second position at said later time.

5. The apparatus defined in claim 1, wherein:

the image frames are in analog format; and said image processing means includes analog-to-digital converter means for converting each of said first and second image data from analog format to digital format.

6. The apparatus defined in claim 5, wherein:

said means including camera means derives said first image data and said second image data as image frames; and said image processing means comprises frame store memory means responsive to a first digital output from said analog-to-digital converter means for time-delaying said first image data by the time difference between said later second time and said earlier first time, means including warp means and residual displacement estimation means for warping an output from said frame store memory means so that stationary objects depicted by said warped time-delayed first image data substantially coincide in position with stationary objects depicted by a second digital output that defines said second image data, means for computing and means, including subtraction means and a Gaussian pyramid, for computing the local change energy estimation in the difference between said warped time-delayed first image data and said second image data.

7. The apparatus defined in claim 6, wherein:

said means including camera means derives said first image data from a first camera and derives said second image data from a second camera; and said analog-to-digital converter means comprises a first analog-to-digital converter for converting said first image data from analog format to digital format and a second analog-to-digital converter for converting said second image data from analog format to digital format.

8. The apparatus defined in claim 6, wherein:

said means including camera means derives said first image data from a single camera at said earlier first time and derives said second image data from the same single camera at said later second time; and said analog-to-digital converter means comprises a single analog-to-digital converter for converting said first image data from analog format to digital format at said earlier first time and for converting said second image data from analog format to digital format at said later second time.

9. In apparatus comprising means including camera means situated on said moving platform for viewing a 3-dimensional scene from a moving platform, and image processing means responsive to image data from said means including camera means; wherein:

said moving platform comprises a vehicle that is movable in a given direction of travel; and said means including camera means comprises a bar oriented substantially in a horizontal plane that is rotatably mounted to said vehicle at a given point of said bar in between opposite ends thereof for rotation of said bar about a substantially vertical axis, first and second cameras respectively attached to said bar on either side of said given point toward the opposite ends of said bar with said first camera occupying said first position and said second camera occupying said second position.

10. The apparatus defined in claim 9, wherein:

said means including camera means further comprises means rotating said bar into a position that is in substantial alignment with said given direction of travel with said first camera being situated forward of said second camera with respect to said given direction of travel;

whereby said apparatus can be operated in a moving-object indicator mode in which said first camera derives said first image data of said scene at an earlier first time from said first position with respect to said vehicle and said second camera derives said second image data of said scene at a later second time from said second position with respect to said vehicle that is spatially displaced by said bar a given distance from said first position such that the spatial position with respect to said viewed scene depicted by said second image data at least approximates the spatial position with respect to said viewed scene depicted by said first image data.

11. The apparatus defined in claim 9, wherein:

said means including camera means further comprises means rotating said bar into a position that is angularly displaced from said given direction of travel by a given angle of gaze;

whereby said apparatus can be operated in a stereo-vision mode in which said first camera derives said first image data of said scene at said given angle of gaze from said first position with respect to said vehicle at the same time as said second camera derives said second image data of said scene at said given angle of gaze from said second position with respect to said vehicle.

12. An imaging method for distinguishing moving objects from stationary objects in a 3-dimensional scene that is viewed from a moving platform, wherein said 3-dimensional scene may include objects at different distances from said moving platform; said method comprising the step of:

deriving first image data of said scene at a first time from a first position with respect to said moving platform by pointing camera means in a predetermined direction toward said scene and for deriving second image data of said scene at a second time from a second position with respect to said moving platform by pointing said camera means in substantially the same predetermined direction toward said scene, said second position being spatially displaced a given distance from said first position such that the spatial position with respect to said viewed scene depicted by said second image data at least approximates the spatial position with respect to said viewed scene depicted by said first image data;

whereby said first and second image data results in minimizing the depiction of parallax between relatively near and far objects in said 3-dimensional scene caused by movement of said moving platform.

* * * * *